United States Patent
Schönnenbeck

(10) Patent No.: US 7,090,601 B2
(45) Date of Patent: Aug. 15, 2006

(54) TRACTOR HITCH TRANSMISSION

(75) Inventor: Gert Schönnenbeck, Neu-Anspach (DE)

(73) Assignee: PIV Drives GmbH, Bad Homburg (DE)

( * ) Notice: Subject to any disclaimer, the term of this patent is extended or adjusted under 35 U.S.C. 154(b) by 305 days.

(21) Appl. No.: 10/623,467

(22) Filed: Jul. 18, 2003

(65) Prior Publication Data

US 2004/0132567 A1    Jul. 8, 2004

(30) Foreign Application Priority Data

Jul. 19, 2002    (DE) .............................. 102 32 804

(51) Int. Cl.
- F16H 63/02 (2006.01)
- F16H 61/06 (2006.01)
- B60K 25/06 (2006.01)
- F16D 25/00 (2006.01)

(52) U.S. Cl. ................. 474/18; 474/28; 180/53.6; 192/85 R; 192/3.53

(58) Field of Classification Search ................ 474/18, 474/28, 11, 46, 70, 37; 192/3.58, 3.63, 85 R; 180/376, 337, 53.1, 53.6; 477/46–49, 180–181; 280/20, 43; 475/80, 211
See application file for complete search history.

(56) References Cited

U.S. PATENT DOCUMENTS

| | | | |
|---|---|---|---|
| 4,157,877 A | * | 6/1979 | Lee .............................. 180/20 |
| 4,196,859 A | | 4/1980 | Trott et al. |
| 4,535,859 A | * | 8/1985 | van der Lely ................ 180/15 |
| 4,699,259 A | * | 10/1987 | McColl ................... 192/70.12 |
| 5,364,316 A | * | 11/1994 | Brambilla ..................... 475/80 |
| 5,601,172 A | * | 2/1997 | Kale et al. ................. 192/85 R |
| 6,182,784 B1 | * | 2/2001 | Pestotnik ..................... 180/376 |
| 6,517,465 B1 | * | 2/2003 | Hrazdera .................... 477/174 |

FOREIGN PATENT DOCUMENTS

| | | | | | |
|---|---|---|---|---|---|
| DE | 3542500 A1 | * | 6/1987 | | |
| DE | 3703759 A1 | * | 9/1987 | | |
| JP | 10-16583 A | * | 1/1989 | | |
| JP | 03-103653 A | * | 4/1991 | ................... 474/11 |
| JP | 05-338478 A | * | 12/1993 | ................... 477/46 |
| JP | 10-131985 A | * | 5/1998 | | |
| JP | 2001-260931 A | * | 9/2001 | | |

* cited by examiner

*Primary Examiner*—Marcus Charles
(74) *Attorney, Agent, or Firm*—Egbert Law Offices

(57) ABSTRACT

The invention involves an agricultural machine with a drive train to be coupled onto the power take-off shaft of a tractor, with a transmission integrated into the drive train. In these types of agricultural machines it is frequently necessary, after starting at a high torque, to select a lower transmission ratio, so that the agricultural machine can be driven at an optimal speed by an engine to which sufficient power is then still available for the propulsion for the tractor. In order to make this possible, it is proposed, in an agricultural machine of this type, to construct the transmission as a continuously variable conical-disk belt or chain transmission which is preferably fully hydraulic, is coupled with a hydraulic clutch, and has idle-shifting in the starting transmission ratio.

5 Claims, 3 Drawing Sheets

TRACTOR HITCH TRANSMISSION

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

1. Field of the Invention

The invention involves an agricultural machine with a drive train to be coupled onto the power take-off shaft of a tractor with a transmission integrated into the drive train.

2. Background of the Invention

In farming, there are many agricultural machines that are mounted onto a tractor and/or a traction engine and which, for their operation, receive the power from the power take-off shaft of the tractor and/or traction engine. In order to bring the power within the agricultural machine to the point at which it is finally needed, these agricultural machines have a drive train, which is coupled accordingly to the power take-off shaft of the tractor. It is also known in the process, to integrate a transmission gear into this drive train in order to ensure that the drive power delivered by the power take-off shaft is used at a best-possible operating speed of the agricultural machine. This applies, for example, for distribution work, mixing work, receiving of materials, etc.

Frequently, agricultural machines of this type are provided for this purpose with simple transmissions that can be switched, especially at an idle. These transmissions, however, have the disadvantage that a gear transmission ratio once selected must then also be used for the entire operating process. This is especially problematic when an especially high transmission ratio is required, in particular, only to start the agricultural machine.

Problems of this nature occur especially for fertilizer spreaders or so-called vertical mixers. Vertical mixers are used, for example, to prepare fodder. A vertical mixer of this type has a mixing spiral arranged in a store tank, by which the fodder, etc. in the store tank is transported to an outlet opening. In a vertical mixer of this type, the store tank is filled from a silo, while the mixing spiral rotates. In order to then drive the fodder, for example, from the silo to the output point, the entire power of the tractor is required for the propulsion during driving. Accordingly, the power take-off shaft, by which the mixing spiral of the vertical mixer is driven, is separated from the engine of the tractor so that it does not divert any more power, and the entire engine power is thus available for the driving operation of the tractor. During the drive, the mixing spiral of the vertical mixer thus stands still.

Through the driving operation with the associated vibrating of the vertical mixer, the fodder filled into it settles. At the position at which the fodder then should be run out via the mixing spiral, it must first be "broken loose" again because of the settling of the fodder that has occurred.

After the thus high engine starting force necessary for this, the required driving power for the mixing spiral then drops markedly as the fodder continues to be output. Thus, the possibility arises fundamentally for continuing to operate at a lower transmission ratio after the fodder has been "broken loose".

In the simple transmissions used until now, only able to be switched at an idle, this means, however, that the drive train must be brought into an idle again and then must be driven again after a low transmission ratio is introduced. Also, in this process, a "break-loose" torque that is high at the beginning is to be overcome again, which greatly loads the drive train.

Also, the problems then remain that the transmission ratio necessary during the renewed break-loose procedure must continue to be maintained after that, so that the driving must be done, for a continued output of fodder, at a transmission ratio that continues to be too high. The driving speed is thus not optimal and the output of fodder, fertilizers, etc. lasts, in the end, unnecessarily long.

BRIEF SUMMARY OF THE INVENTION

The purpose of the present invention is thus to further develop an agricultural machine like the one given above in such a way that using it, a power-optimized and time-optimized operating procedure can be achieved.

The agricultural machine should thus also in particular lead to a robust construction which is appropriate for the harsh requirements in the farming business.

This purpose is achieved according to the invention in that as a transmission in the agricultural machine, a continuously variable conical-disk belt or chain transmission is provided.

A continuously variable conical-disk belt or chain transmission has the possibility to be shiftable even under load, whereby it is ensured that for the setting of a best-possible transmission ratio of the transmission, no (new) interruption of the drive of a mixing spiral, etc., is necessary, which would lead to a renewed settling with a subsequently necessarily renewed breaking loose of material, e.g. in a vertical mixer, a fertilizer spreader, etc.

Thus, there is the possibility to adjust the power required for the output of fodder or fertilizer or for other work of agricultural machines in the best possible way to the actual requirement, whereby at the same time, a maximum operating speed and thus as short a duration as possible is achieved for a job. From this, corresponding time and cost advantages result for the application of an agricultural machine of this type.

Now, it is essential for an optimal usage in farming, that an operator of a corresponding agricultural machine is unencumbered as much as possible. This also means, however, that it is advantageous if a drive train with a corresponding continuously variable transmission can be switched off in each transmission ratio position of the transmission without at first being brought into a starting position that is necessary later.

In order to make this possible, it is proposed to integrate into the drive train, an idle-shifting into a starting transmission ratio, just like a corresponding power flow interrupter. The power flow interrupter is necessary in the process, since for the idle-shifting, the transmission may not be loaded.

Advantageously, a clutch is provided as a power flow interrupter. It is also possible, however, to use a hydraulic converter or the like.

In order to increase the operating comfort and thus the ergonomic operating capability, it is proposed to activate the clutch hydraulically and also to design the conical-disk belt or chain transmission so that it is fully hydraulic. It would also be, however, fundamentally in the context of the invention, to design the clutch and/or the conical-disk belt or chain transmission so that it can be shifted in a purely mechanical manner, i.e. manually.

In this context it is proposed especially to provide the agricultural machine itself with at least one hydraulic pump that delivers the hydraulic pressure to the fully hydraulic conical-disk belt or chain transmission and/or the clutch to be activated hydraulically. Thus, the agricultural machine does not load in operation the hydraulic circuit of the tractor that is driving it, onto which it could be alternatively coupled.

In principle, the hydraulic pump of the agricultural machine should also be driven by the power take-off shaft of the tractor, so that here no other separate, constructively expensive drive is provided.

In a preferred embodiment form, the agricultural machine has an additional control, with which the clutch and the idle-shifting are to be activated in a manner time-offset from each other. In this way, it can be ensured that the idle-shifting is first activated when the clutch is opened and the clutch is only closed again later, when the idle-shifting has reached the starting transmission ratio of the conical-disk belt or chain transmission.

In order to be able to precisely determine the latter, it is proposed to allocate the control to at least one position recognition sensor, with which one of the movable conical disks of the conical-disk belt or chain transmission is monitored. If it has reached an end position, the closing of the clutch and thus a power transfer via the transmission is turned on again by the control.

In particular, the clutch is thus connected to the hydraulic supply of the conical-disk belt or chain transmission, whereby it is ensured that it first transfers torque if a minimum pressure has built up in the application pressure system of the conical-disk belt or chain transmission. The clutch is, moreover, opened by activation of the switch to deliver an input signal to the control. At the same time or in a time-offset manner somewhat later, an idle-shifting valve is opened by the control. This then makes possible the idle-shifting of the fully-hydraulic conical-disk belt or chain transmission into the starting position.

Upon reaching an end position or during manual clearing of the input signal mentioned above which triggers the idle-shifting, the idle-shifting valve is closed again and the clutch is first impinged again with compressed oil at this point in time or another somewhat later point in time.

This sequence can either be controlled by a microprocessor present in the control or also by a separate adjustable time relay present in it.

In this process, the corresponding hydraulic valve with which the clutch is opened can be controlled both electro hydraulically as well as in turn from the electro hydraulic idle-shifting valve.

It has thus been ensured especially via the control that the introduction of the restarting procedure is possible only after the end of the idle-shifting.

BRIEF DESCRIPTION OF THE SEVERAL VIEWS OF THE DRAWINGS

Additional advantages and characteristics of the invention result from the following description of an embodiment example.

DETAILED DESCRIPTION OF THE INVENTION

Figure 1:
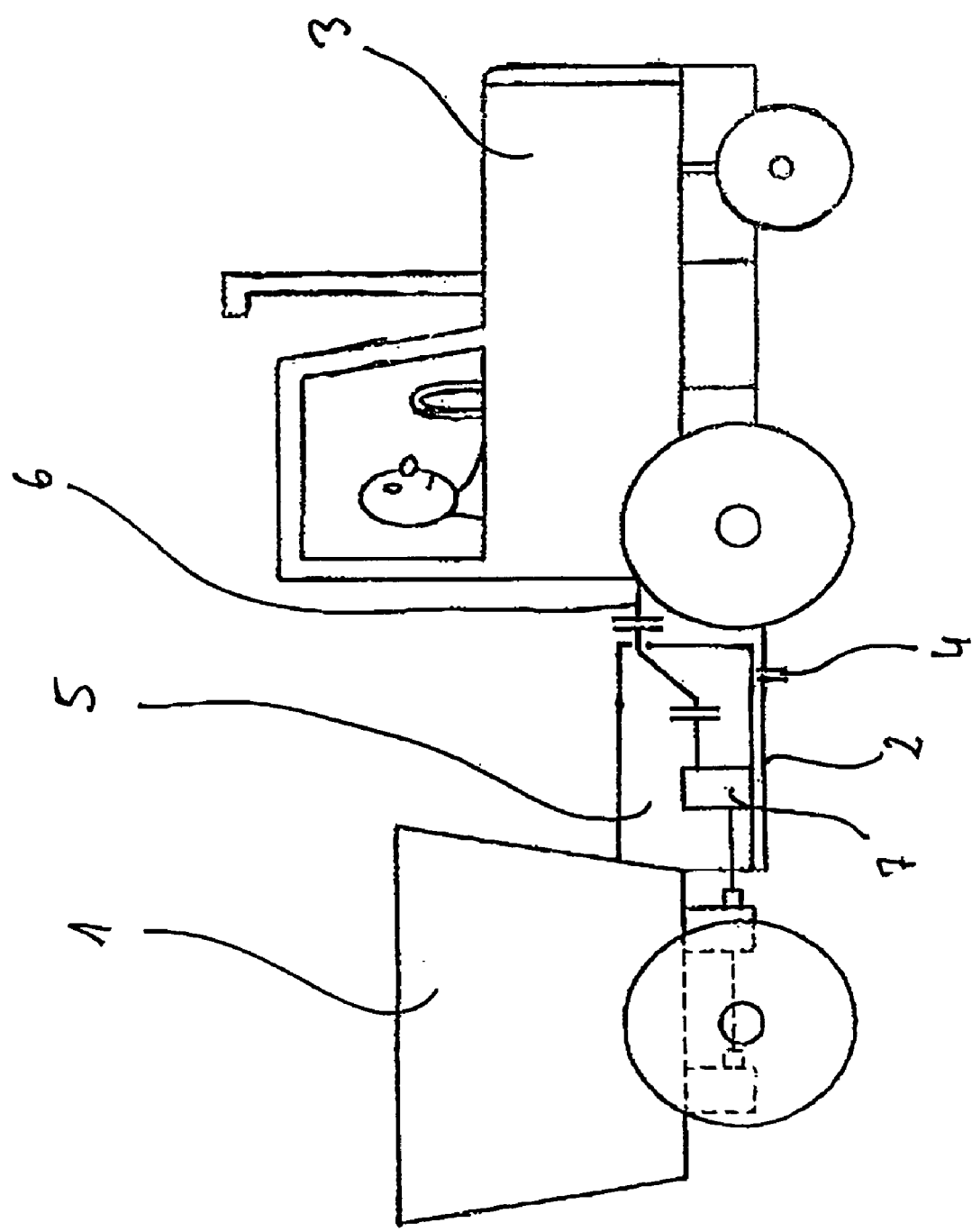
FIG. 1 is a side elevation view showing the principle diagram of an agricultural machine according to the invention behind a tractor.

In FIG. 1, a principle diagram shows an agricultural machine 1, which is coupled via a customary hitch 2, among other things, to a trailer coupling 4 of a tractor 3. Aside from an agricultural machine as shown here that is towed behind, agricultural machines that are also mounted directly onto the tractor can be provided.

The agricultural machine has a drive train 5, which is coupled onto a power take-off shaft 6 of the tractor 3.

This power take-off shaft 6 functions in the tractor for the delivery of power to agricultural machines or devices, which are mounted onto the tractor 3. It is connected or rigidly coupled if necessary via a pre-transmission to the engine of the tractor 3.

Power delivered from the engine of the tractor is thus conducted via the power take-off shaft 6 and the drive train 5 into the agricultural machine 1. Thus, this power is not available in a situation of this type for the propulsion of the tractor and the suspended agricultural machine. In order to then make it so that when driving the tractor over ordinary roads, etc., no unnecessary power is conducted into the agricultural machine, the drive train 5 and/or power take-off shaft 6 can be uncoupled from the engine via a clutch of the engine, e.g. during road transport. The power of the engine of the tractor 3 then is fully available for the driving operation.

During road transport, however, it can occur that fodder, fertilizer, or other spreadable materials in the agricultural machine 1 can possibly become so greatly compressed due to vibrations that a subsequent starting of the agricultural machine requires a high starting torque, for which purpose a transmission gear 7 present in the drive train 5 is correspondingly installed.

Since transmission gears of this type have a quite simple construction in agricultural machines, a subsequent switching under load is no longer possible. Thus, the gear 7 remains in a corresponding pre-selected transmission ratio and for a subsequent driving of the tractor, the possible driving power and thus the speed are determined through the set transmission ratio of the transmission gear 7 and are limited to the upside.

In order avoid these problems, for the transmission gear in the embodiment form proposed here, a conical-disk belt or chain transmission with a continuously variable shiftable and movable transmission ratio is used, which in order to generate axial application forces of conical disks onto a traction mechanism, has hydraulic tensioning mechanisms which are impinged with pressure medium via a corresponding control valve.

A device of this type also makes possible under load a shifting of the transmission gear 7 to a transmission ratio at which a best-possible distribution of the power of the engine of the tractor 3 for the propulsion, on the one hand, and the drive of the agricultural machine 1 on the other hand, is to be achieved.

Figure 2:
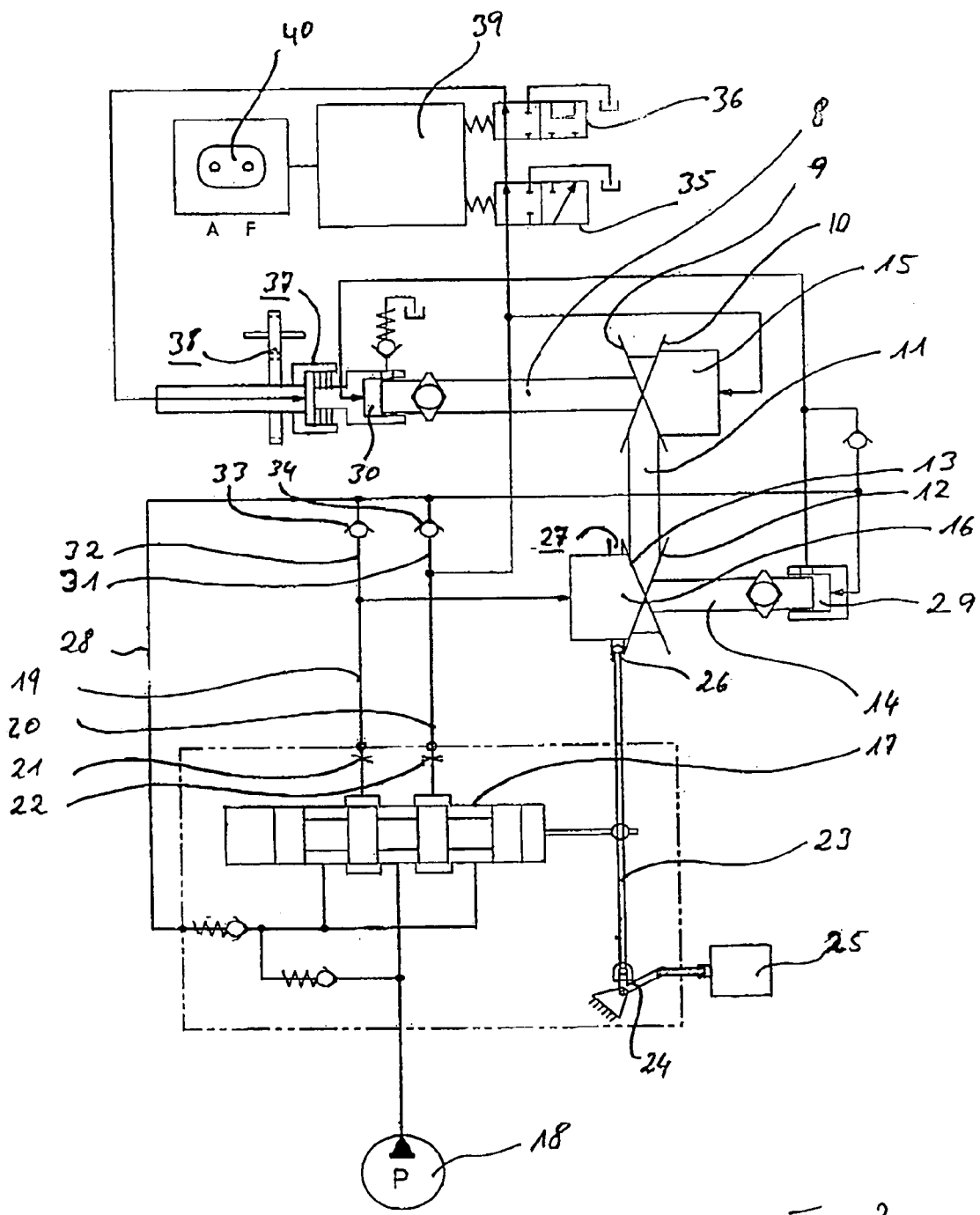
FIG. 2 is a schematic view showing the hydraulic diagram for a continuously variable conical-disk belt or chain transmission with idle-shifting valves and clutch relief valves connected to a microprocessor or time relay.

In FIG. 2, a corresponding hydraulic diagram is shown for a corresponding continuously variable shiftable conical disk transmission.

From the power take-off shaft (not shown), a drive-side disk assembly 9, 10 of a conical-disk transmission is driven via a drive shaft 8. This assembly is connected via a traction mechanism 11 to a drive-output side disk assembly 12, 13, which is sitting on the drive-output shaft 14. By this drive output shaft, the agricultural machine is driven (not shown).

On each shaft 8, 14, one of the conical disks, namely the conical disks 10, 13 for the shifting of the gear transmission ratio can be moved axially, for which purpose they are constructed in a known way as cylinder sheaths 15, 16 of hydraulic pressure cylinders, whose pistons are arranged affixed to the shaft.

Thus, in each of the axially movable conical disks 10, 13, a hydraulic tensioning mechanism is constructed, to which pressure medium is dosed via a square distributing regulator 17.

For this purpose, from a pressure medium pump 18, which is also driven in a manner not depicted here by the power take-off shaft 6, hydraulic fluid is given to the distributing regulator 17, from where it then is dosed correspondingly to the position of the regulator via the lines 19, 20 to the hydraulic tensioning mechanisms on the two transmission sides. In this process, the hydraulic medium flows via cylinder throttles 21, 22 that are themselves known.

The adjustment of the distributing regulator 17 is done via a sensor lever 23, whose one end is adjusted via a rocker arm 24 by a transmission gear shifting device 25. On its other end, the sensor lever 23 is guided by a sliding ring 26 in a circumferential groove 27, which is constructed on the axially movable conical disk 13.

The hydraulic medium flowing out from the square distributing regulator 17 flows over a sensor line 28 to torque sensors 29, 30. These torque sensors are constructed so that they pump a certain quantity of pressure medium back into the line 28 upon the occurrence of torque impact forces, in order to provide in this way a sudden pressure medium requirement for the support of the torque impact force onto the conical disks 10 and/or 13 that are axially movable on the driving side and the driven side of the conical disk transmission.

So that these pressure medium quantities are available as quickly as possible on the aforementioned axially movable conical disks, located between the line 28 and the lines 19 and 20, there are line connections 31, 32 with return valves 33, 34 over which the hydraulic medium quantities delivered from the torque sensors 29 and/or 30 flow upon the occurrence of torque impact forces.

The shifting of this transmission is done by a shifting of the transmission ratio shifting device 25, which leads to an excursion of the sensor lever 23. Via the sensor lever 23, the square distributing regulator is made to undergo an excursion until the corresponding transmission ratio is set on the conical-disk transmission, whereby this is checked by sensing of the position of the conical disk 13 via the sliding ring 26 on its circumferential groove 27. When the end position is reached, the distributing regulator 17 is then put back into its original position via the sensor lever 23.

Next, it is problematic if the drive of the transmission is set in any desired transmission ratio. For starting, the conical-disk belt or chain transmission must then namely be brought into a starting position. This is not possible in a practical way, however, for conical-disk transmissions at normal application pressure ratios. The reason for this is that for conical-disk transmissions of the type described here, the resistance against shifting movements increases greatly when the rotational speed of the traction mechanism decreases, and thus at an idle of the transmission, it has reached a maximum.

In order to solve these problems, it is known to perform an idle-shifting of the conical-disk transmission in which the hydraulic medium pressure is taken away by the tensioning mechanisms.

In the embodiment example shown in FIG. 2, a corresponding idle-shifting valve 35 is provided for this purpose. By activation of this valve in the example shown here, pressure is released on the drive side of the disk 10 so that the traction mechanism 11 can be adjusted to another transmission ratio circumference. In the example shown here, in addition, a clutch relief valve 36 is provided that upon activation makes it so that a hydraulic multi-disk clutch 37 is opened which in a closed position causes the rotation of the drive shaft 8. In this way, the drive on the drive side of the hydraulic multi-disk clutch is correspondingly variable via a corresponding pre-transmission 38.

It should also be noted here that in the example shown here the idle-shifting valve 35 and the clutch relief valve 36 are electromagnetically activated by a microprocessor 39.

The hydraulic multi-disk clutch 37 is integrated into the hydraulic supply of the chain converter, so that it only closes and thus transfers a torque if the application pressure of the chain converter has built up to a minimum pressure.

By activation of a switch button 40, the clutch is opened, whereby the microprocessor 39 activates the clutch relief valve 36. At the same time or in a time-offset manner somewhat later, the idle-shifting valve 35 is activated by the microprocessor 39, which then introduces the idle-shifting.

Only when the switch button 40 is reset is the clutch 37 then closed by the microprocessor 39 by activation of the clutch relief valve 36. At the same time or in a time-offset manner somewhat earlier, the idle-shifting valve 35 is activated by the microprocessor 39, which leads to the build up of pressure in the pressure medium in the hydraulics of the conical-disk transmission.

It is not shown here that the end of the idle-shifting can be announced by a signal to the microprocessor 39, whereby a corresponding signal is delivered by a proximity switch (not shown), which delivers a corresponding signal upon reaching the starting position of one of the offset disks 10 or 13. Instead of this, a minimum time can also be set on the microprocessor, in which the idle-shifting is performed. When this minimum time has elapsed, a corresponding signal can be generated that the idle-shifting is concluded.

Only the thus definitive ending of the idle-shifting makes it possible for the microprocessor 39 to introduce the restart procedure.

Aside from a microprocessor, an adjustable time relay can also be used which is correspondingly activated by the switch 40.

Figure 3:
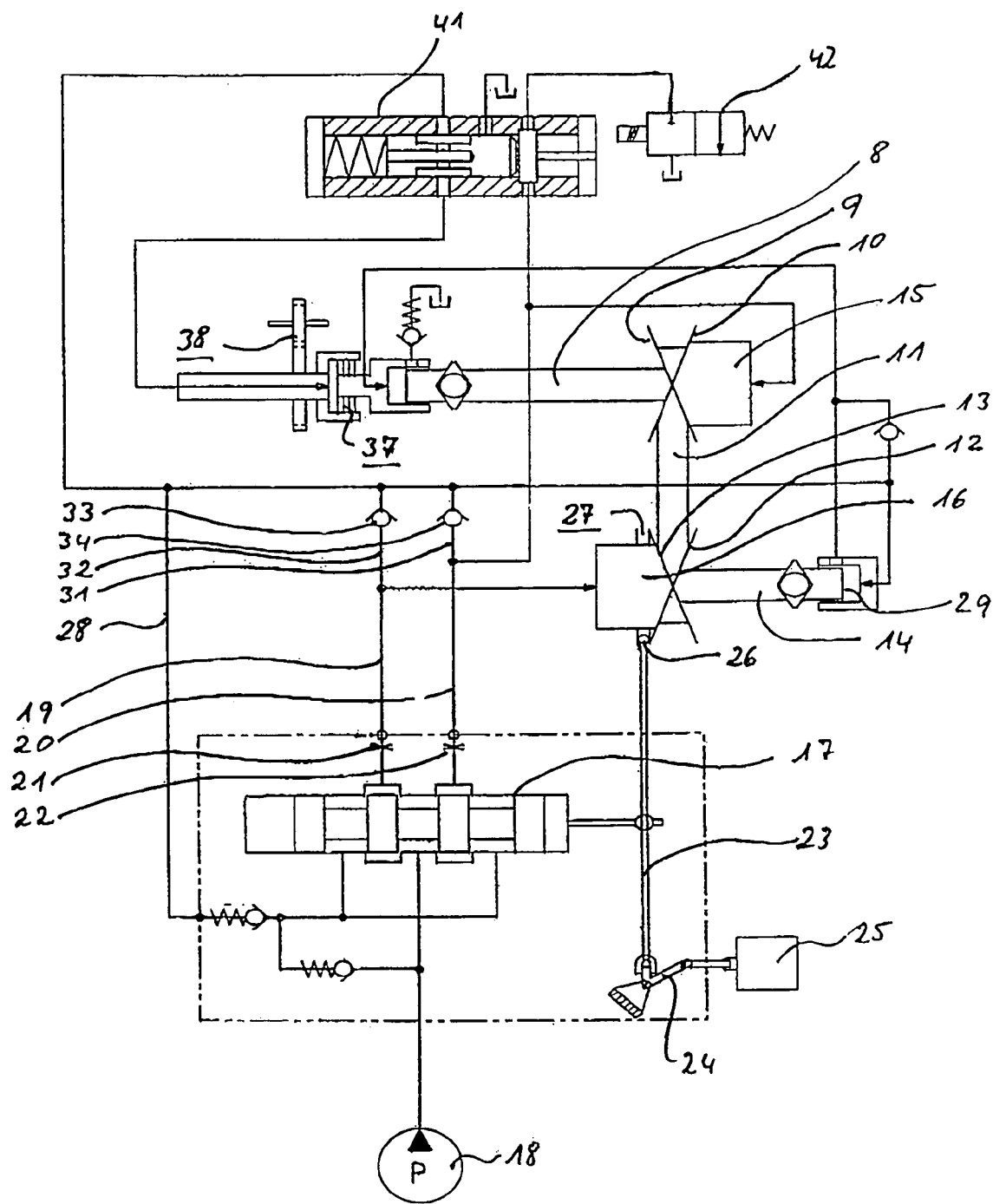
FIG. 3 is another schematic view showing the hydraulic diagram for a continuously variable conical-disk belt or chain transmission with a clutch relief valve hydraulically controlled by an idle-shifting valve.

In FIG. 3, in which the same parts were provided with the same reference indicators, instead of a microprocessor control for the clutch relief valve and/or the idle-shifting valve, a hydraulically activated clutch relief valve 41 is provided, which is controlled by an electro hydraulic idle-shifting valve 42.

Also here it is ensured that the hydraulically activated clutch is released upon activation of the idle-shifting valve and it is put in mesh again when the idle-shifting valve is reset.

I claim:

1. An apparatus for coupling to a power take-off shaft of a tractor comprising:
   an agricultural machine having a drive train, said drive train having a transmission integrated therewith, said drive train for coupling to the power take-off shaft of said tractor, said transmission being a continuously variable conical-disk belt or chain transmission;
   a power-flow interrupter cooperative with said conical-disk belt or chain transmission in said drive train of said agricultural machine, said power-flow interrupter being a clutch; and
   a pumping means coupled to at least one of said transmission and said clutch for delivering hydraulic pressure to at least one of said transmission and said clutch; said power take-off shaft being drivingly connected to said pumping means.

2. The apparatus of claim 1, said clutch being hydraulically activated.

3. The apparatus of claim 1, said conical-disk belt or chain transmission being fully hydraulic.

4. An apparatus for coupling to a power take-off shaft of a tractor comprising:
   an agricultural machine having a drive train, said drive train having a transmission integrated therewith, said drive train for coupling to the power take-off shaft of said tractor, said transmission being a continuously variable conical-disk belt or chain transmission;
   a power-flow interrupter cooperative with said conical-disk belt or chain transmission in said drive train of said agricultural machine, said power-flow interrupter being a clutch; and
   a controlling means cooperative with said clutch for time-offset triggering of said clutch.

5. The apparatus of claim 4, said conical-disk belt or chain transmission having a conical disk, the apparatus further comprising:
   at least one position detection sensor for said conical disk being assigned to said controlling means.

* * * * *